United States Patent Office 3,056,386
Patented Oct. 2, 1962

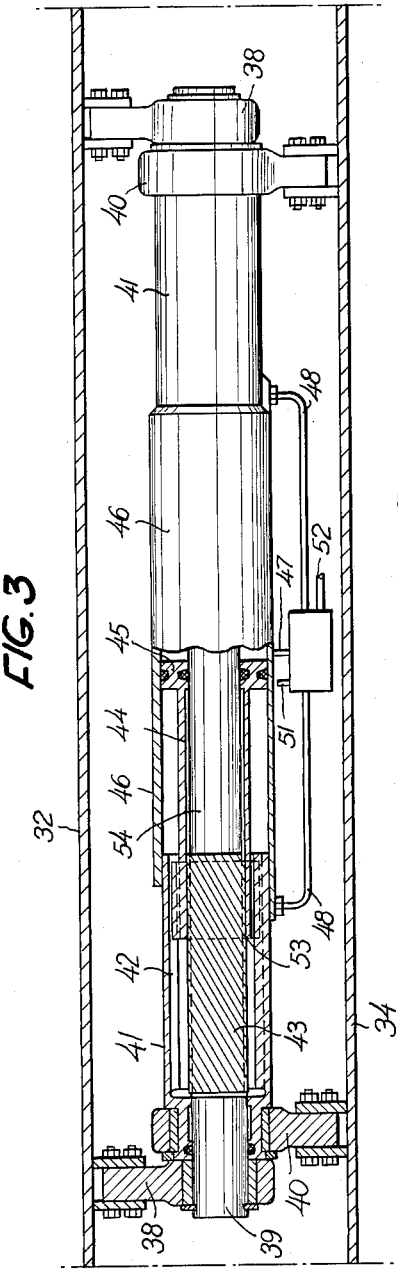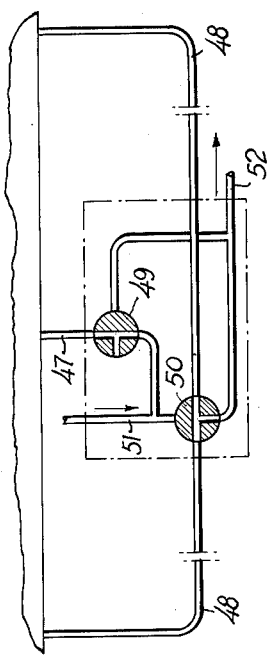

3,056,386
APPARATUS FOR ARTICULATING HINGEDLY CONNECTED PARTS
Reinhardt Olai Aarvold, Stenkullen, and Erik Holger Isaksson and Anders Georg Wadman, Goteborg, Sweden, assignors to Aktiebolaget Gotaverken, Goteborg, Sweden, a corporation of Sweden
Filed July 21, 1958, Ser. No. 749,684
Claims priority, application Sweden Aug. 3, 1957
4 Claims. (Cl. 121—119)

The present invention relates to a device for bringing about an angular displacement between two parts hingedly connected to each other, e.g. the sections of a ship's hatch cover or the like, by the aid of a pressure medium operated mechanism.

Different means have already been proposed for performing a desired movement by means of a pressure medium operated apparatus. Such means have usually been arranged to operate between the movable part and a fixed framing, and have acted at right angles to the hinge axis in order to force apart or to bring the parts together. The apparatus has often been located in such a place that it easily could be damaged and the mechanism has been comparatively expensive.

The object of the invention is a mechanism working in direct connection with two of the hinges or other devices connecting the parts, which entails great advantages with regard to the space required.

Another object is the construction of a mechanism having a pair of co-acting members movable parallel to the hinge axis thereby to provide an apparatus simple in design and easy to cover.

Another, and important, object of the invention is to provide a mechanism for bringing about angular displacement between two parts hingedly connected together, in which mechanism a pair of actuation members so co-act as to balance each other to minimize axial forces transferred from the mechanism to the hinged parts.

Further objects will be apparent of the following specification and the appendant claims.

Figure 1:
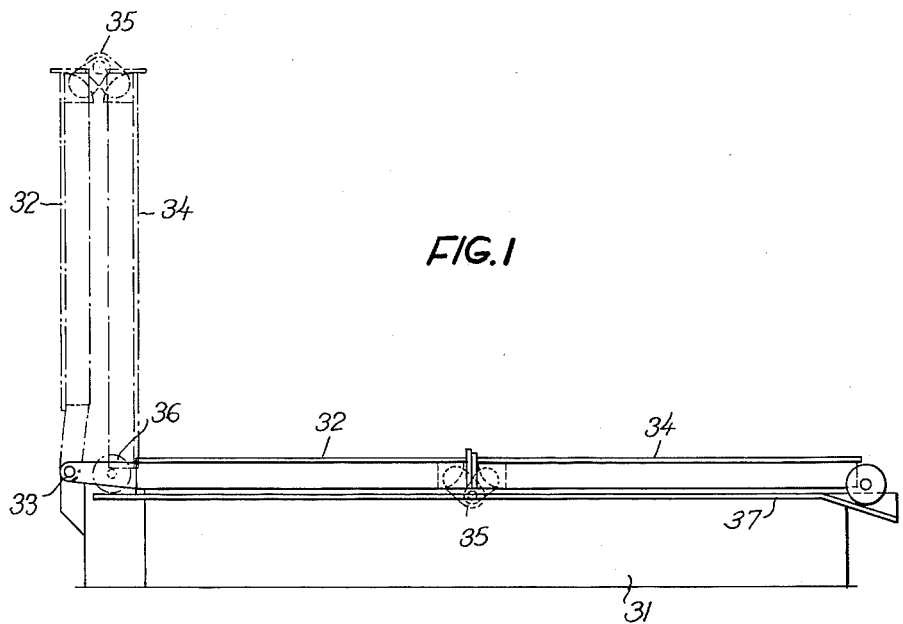
Figure 2:
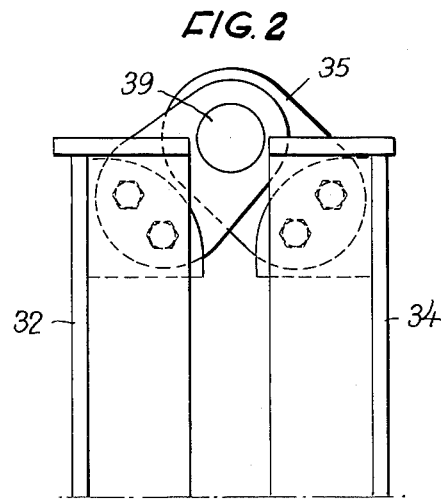
Figure 5:
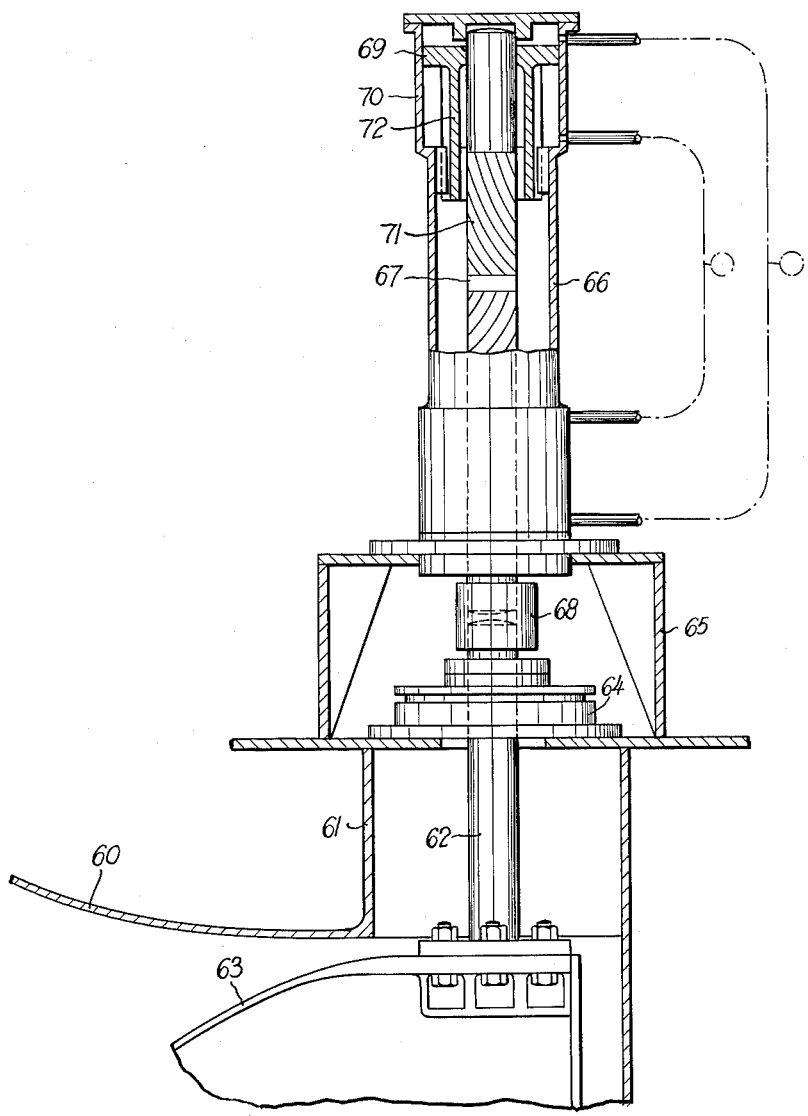

In the accompanying drawings the invention is shown by way of example as applied to hatch covers. FIGURE 1 is a side view of a hatch cover used on a weather deck and provided with an actuating mechanism in accordance with the present invention. FIGURE 2 is a view on an enlarged scale showing the hinge device between the hatch cover sections therein. FIGURE 3 shows a double hinge device between two sections in open position and with a partly cut away view of the operating mechanism, and FIGURE 4 is an enlarged detail of a device for regulating the pressure medium supply as shown in FIGURE 3. FIGURE 5 is a partly sectioned side view of a steering engine of a ship in which an operating mechanism according to the invention is used.

In the embodiment shown in FIGURES 1-4 an opening in a ship's deck is arranged to be closed by two cover sections. The hatch opening in a known manner is enclosed by a coaming 31, to one side of which one hatch cover section 32 is attached by means of hinges 33. The other hatch cover section 34 is connected to the first one by a number of hinges 35. The opposite end of the section is provided with wheels 36, which roll on a track 37 along the coaming. An operating mechanism arranged between two hinges connecting the sections is shown in FIGURE 3. Each hinge comprises a bracket 38, preferably detachably connected to section 32, which supports a non-revolving pin 39. In a similar manner a bracket 40 is connected to section 34, and this bracket supports a non-revolving cylinder 41 which extends to the corresponding bracket of the other hinge. The pins of the two hinges, respectively, are connected by a bar 54 extending through the cylinder. This cylinder is designed to enclose the bar 54 with a certain clearance. The cylinder is provided with internal splines forming two sets of first guiding surfaces 42, while the bar 54 is provided with two sets of helically running splines 43 forming second guiding surfaces. The cylinder 46 is provided with two pistons 45, 45 working in opposite directions under the influence of a pressure fluid. Each piston has a hollow piston rod 44 extending in axial direction with respect to the cylinder. One end portion of said hollow rod is designed as a sleeve 53 which bridges the radial clearance between the cylinder and the bar 54 and is provided with guiding means mating with the splines forming the first and the second guiding surfaces on the cylinder and on the bar, respectively. The pistons are provided with central apertures through which the bar passes, thereby providing a guide for the pistons. The cylinder is connected with pressure medium supplying pipes 47 and 48, respectively, said pipes being connected to the cylinder at each side of the respective end positions of the piston. The length of the part of the bar 54 provided with splines and the pitch of the helical splines are chosen in such a manner that the desired movement between the parts will be obtained, in this case 180 degrees. The splines on the cylinder may also be helical in order that a greater turning movement for a smaller piston stroke be obtained.

While the present embodiment shows that full-length splines are located on the cylinder and on the bar while guiding means are located in a short sleeve portion of the hollow piston rod, it will be obvious to the reader that the reverse relationship is possible. This alternative relationship of the parts of the device is illustrated in FIG. 5, which latter will be specifically described hereinafter.

The present embodiment is double acting so far as the extended parts of the cylinders at two adjacent hinges are built together. In this case the supply pipe 47 for the pressure fluid, e.g., oil, will be common and the two pistons 45 will move towards and from each other in the same cylinder. The device for regulating the supply of pressure medium is schematically shown in FIGURE 4. This consists of a three-way valve 49 arranged in connection with pipe 47 and another three-way valve 50 arranged in connection with pipes 48. Both valves may preferably be attached to a common shaft for simultaneous operation. The pressure medium is supplied from a suitable pressure source, for instance a pump or a pressure tank, and the medium is withdrawn by a pipe 52, for instance to a storage tank. In the position shown here, a pipe 51 is in connection with the space between the pistons, while the spaces on the other sides of the pistons are connected to the pipes 52. When the hatch cover is to be moved in the opposite direction, the valves are so turned that the pipes 48 are connected with the inlet, while pipe 47 is connected with the outlet.

The device above described may also, preferably in such a case where only one hatch cover section is used, be arranged at the hinges 5 or 33, respectively.

As shown in FIGURE 5 said device may successfully be used as steering engine of a ship. The hull 60 is provided with a well 61 for the shaft 62 of the rudder 63 which shaft is journalled in a bearing 64 arranged in a casing 65 on the top of which the cylinder 66 of the actuating mechanism is fastened in the vertical position. The bar 67 of said mechanism is connected to the shaft 62 by means of a coupling 68. The actuating mechanism is double-acting and is provided with pistons 69 running in a cylinder 70 at each end of the mechanism 66, respectively. Between said cylinders 70 the bar 67 is provided with two sections of helically running splines 71 one section being left-handed and the other right-handed and co-operating with corresponding splines in the sleeve 72 of the respective piston 69. As described above the sleeve 72 and the cylinder 70 are provided with cooperating splines, whereby an axial movement of the pistons 69 towards or from each other by feeding pressure oil on either side of the pistons in the cylinders will effect a turning movement of the bar 67 which is transmitted to the rudder 63.

What we claim is:

1. In a pressure fluid medium-operated mechanism for bringing about an angular displacement between a first part and a second part connected to each other by means of at least two hinges, an actuating device consisting of a tubular part connected to the first of said parts between the hinges and two pistons reciprocable in opposite directions in said tubular part under the influence of buid pressure, a hollow rod secured to and extending axially from each of said pistons, said hollow rod carrying a sleeve-shaped operating member, two sets of first guiding surfaces arranged on the inside of the tubular part, a transmission device connected to the second part, consisting of a bar connecting the pins of each hinge and extending through the tubular part, but being radially spaced therefrom, second guiding surfaces on said bar opposite said first guiding surfaces, said sleeve-shaped members being arranged to bridge the radial space between and having on opposite sides thereof guiding means mating with said first and said second guiding surfaces, one of said first and said second guiding surfaces of each set being shaped as a plurality of helical running tracks concentrically arranged relative to the hinge axis and extending in opposite directions with respect to the corresponding tracks of the other set, and means for introducing fluid under pressure successively between and on the outer sides of said pistons for effecting a turning movement between said cylinder and said bar with a minimum of axial stress being transferred to the hinged parts.

2. In a pressure fluid medium-operated mechanism for bringing about an angular displacement between a first part and a second part connected to each other by means of at least two hinges, an actuating device consisting of a tubular part connected to the first of said parts between the hinges and two pistons reciprocable in opposite directions therein under the influence of fluid pressure, an outwardly turned hollow rod secured to and extending axially from each of said pistons, said hollow rod carrying a sleeve-shaped operating member, two sets of first guiding surfaces arranged on the inside of the tubular part, a transmission device connected to the second part consisting of a bar connecting the pins of each hinge and extending through the tubular part but being radially spaced therefrom, second guiding surfaces on said bar opposite said first guiding surfaces, said sleeve-shaped members being arranged to bridge the radial space between and having on opposite sides thereof guiding means mating with said first and said second guiding surfaces, one of said first and said second guiding surfaces of each set being shaped as a plurality of helical running tracks concentrically arranged relative to the hinge axis and extending in opposite directions with respect to the corresponding tracks of the other set, and means for introducing fluid under pressure successively between and on the outer sides of said pistons for effecting a turning movement between said cylinder and said bar with a minimum of axial stress being transferred to the hinged parts, the tubular part at each end of said actuating device extending beyond the first sets of guiding surfaces and being sealably fitted against the bar.

3. In a pressure fluid medium-operated mechanism for bringing about an angular displacement between a first part and a second part hingedly connected to each other, an actuating device connected to the first of said parts, said device consisting of a tubular part containing two axially spaced working cylinders parallel to the hinge axis each having a piston reciprocable therein under the influence of pressure fluid, the pistons being arranged to operate in opposite directions with respect to each other, an inwardly turned hollow rod secured to and extending axially from each of said pistons said hollow rod carrying a sleeve-shaped operating member, two sets of first guiding surfaces arranged on the inside of a middle portion of the tubular part forming an axial connection between said working cylinders, a transmission device connected to the second part, said transmission device containing a bar extending through said tubular part but being radially spaced therefrom, second guiding surfaces on said bar opposite said first guiding surfaces, said sleeve-shaped members being arranged to bridge the radial space between and having on opposite sides thereof guiding means mating with said first and second guiding surfaces, said first and said second guiding surfaces of each set being shaped as a plurality of helical running tracks concentrically arranged relative to the hinge axis and extending in opposite directions with respect to the corresponding tracks of the other set, and means for introducing fluid under pressure successively between and on the outer sides of said pistons for effecting a turning movement between said cylinder and said bar with a minimum of axial stress being transferred to the hinged parts.

4. In a pressure fluid medium-operated mechanism for bringing about an angular displacement between a first part and a second part hingedly connected to each other, an actuating device connected to the first of said parts and consisting of a tubular part parallel to the hinge axis and two pistons reciprocable in opposite directions therein under the influence of fluid pressure, a hollow rod secured to and extending axially from each of said pistons said hollow rod carrying a sleeve-shaped operating member, two sets of first guiding surfaces arranged on the inside of the tubular part, a transmission device connected to the second part consisting of a bar extending into the tubular part but being radially spaced therefrom, central apertures in the pistons fitting the bar said pistons thereby being guided by the bar, second guiding surfaces on said bar, said sleeve-shaped members being arranged to bridge the radial space between and having on opposite sides thereof guiding means mating with said first and said second guiding surfaces, one of said guiding surfaces being shaped as a plurality of helical running tracks concentrically arranged relative to the hinge axis and extending in opposite directions with respect to each other, and means for introducing fluid under pressure successively between and on the outer sides of said pistons for effecting a turning movement between said cylinder and said bar with a minimum of axial stress being transferred to the hinged parts.

References Cited in the file of this patent

UNITED STATES PATENTS

| | | |
|---|---|---|
| 243,450 | Lafarque | June 28, 1881 |
| 925,956 | Scott | June 22, 1909 |
| 2,743,618 | Watson et al. | May 1, 1956 |
| 2,855,038 | Greer | Oct. 7, 1958 |
| 2,970,574 | Geyer | Feb. 7, 1961 |

FOREIGN PATENTS

| | | |
|---|---|---|
| 55,607 | France | May 14, 1952 |

(Addition to No. 971,979)